A. KADOW.
PRESSURE REGULATING DEVICE.
APPLICATION FILED NOV. 4, 1914.
1,199,900.
Patented Oct. 3, 1916.
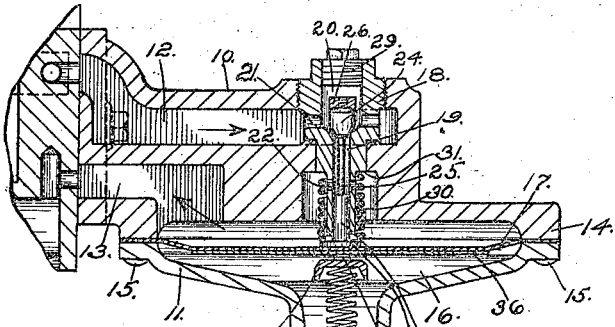
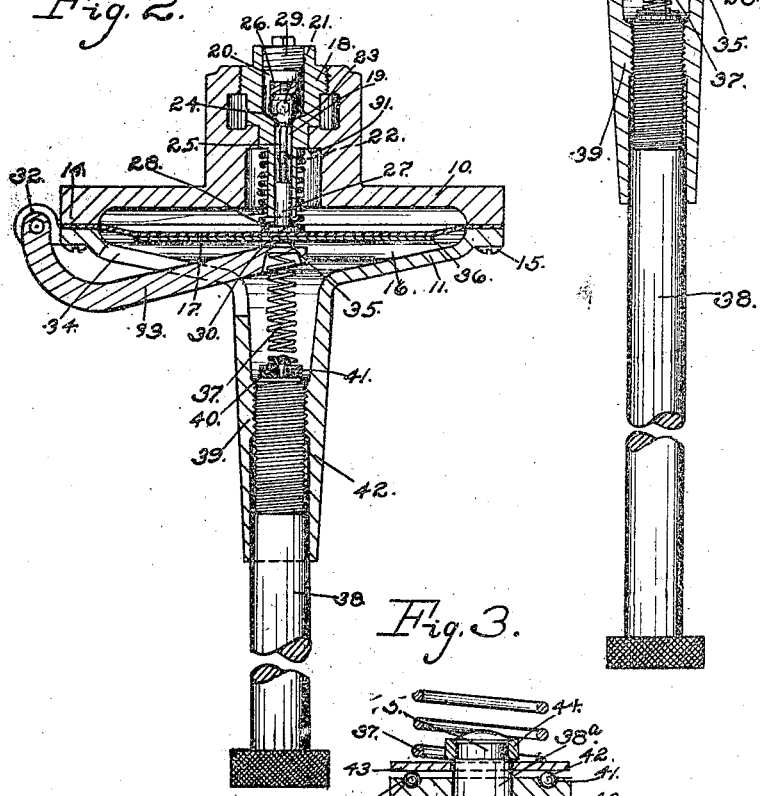

UNITED STATES PATENT OFFICE.

AUGUST KADOW, OF TOLEDO, OHIO, ASSIGNOR TO THE WESTLAKE MACHINE COMPANY, OF TOLEDO, OHIO, A CORPORATION OF OHIO.

PRESSURE-REGULATING DEVICE.

1,199,900.  Specification of Letters Patent.  Patented Oct. 3, 1916.

Application filed November 4, 1914. Serial No. 870,223.

*To all whom it may concern:*

Be it known that I, AUGUST KADOW, a citizen of the United States, residing at Toledo, in the county of Lucas and State of Ohio, have invented certain new and useful Improvements in Pressure-Regulating Devices, of which the following is a specification.

My invention relates to a device for regulating the flow of fluid under pressure, for example compressed air, and the principal object of the invention is to provide a pressure regulating device which will be capable of very close adjustment and in which the friction of the co-engaging parts is reduced to a minimum so that the pressure of the fluid on the low pressure side of the device may be varied by very slight, almost infinitesimal gradations, and will be maintained, regardless of variations on the high pressure side, at precisely the point desired.

While realizing that the pressure regulating device of my invention might be used in various different apparatuses and for controlling gases or other fluids of various sorts, the device is particularly designed for use in regulating the air pressure used in blowing glass articles by automatic machinery. In machinery of this character it is essential that the pressure of air employed in the blowing operation be capable of the minutest and most accurate regulation. The periods of time during which the blanks are subjected to the blowing operation are necessarily fixed as to their length by the automatic character of the operations performed by the machine. Glass, in the semi-solid condition in which it is blown, is an extremely delicate material to handle. Any slight variation in the pressure of the air, one way or the other, from the pressure required, results in spoiling the article. This is particularly so if the blown glass articles are thin, as in the case of electric light bulbs. The pressure regulating device of my invention has, as a matter of fact, been devised particularly with a view to providing means for regulating the air pressure employed in an automatic machine for manufacturing electric light bulbs. Most, if not all, of the pressure regulating devices on the market were tried and found deficient either because incapable of the minute regulation required, or unreliable in the maintenance of the pressure at the desired point. The perfection of the glass blowing machine in question was conditioned upon the production of a suitable pressure regulator and other air controlling devices whereby the blowing operation could be accurately and reliably controlled.

The invention is illustrated, in a preferred embodiment, in the accompanying drawing, wherein—

Figure 1 is a longitudinal sectional view of the device. Fig. 2, a similar view taken at right angles to the plane of Fig. 1, and Fig. 3, a detailed view of the anti-friction bearing between the spring, bearing against the valve-operated diaphragm, and its adjusting member.

Like characters of reference designate like parts in the several figures of the drawing.

Referring to the drawing, the casing of the pressure regulating device consists of an upper casting 10 and a lower casting 11, the upper casting being formed with an inlet port 12, an outlet port 13, and, on the under side, with a circular boss 14 to which is secured, for example by screws 15, the lower casting 11. Extending across the diaphragm chamber 16, formed between the upper and lower castings, is a flexible, preferably rubber, diaphragm 17, the edge of which is clamped between the upper and lower members of the casing. Screwed into an opening extending through the upper casting 10 is a plug or sleeve 18 formed with a bore 19 having at its upper end an enlargement 20 which communicates, by ports 21, with the inlet port 12, the lower end of the plug being formed with ports 22 which put the bore 19 into communication with the diaphragm chamber 16 and outlet port 13 leading therefrom. The plug 18 is formed above bore 19 with a rounded seat 23 for a valve 24. The latter consists of a rubber "Fuller ball" held in place on a stem 25 by a nut 26. The stem 25 terminates in a piston 27 which works in the lower end of bore 19 and is formed with a head 28 bearing against diaphragm 17. The enlargement 20 of bore 19 is closed by a plug 29. A spring 30 is interposed between a shoulder 31, formed on plug 18, and the head 28 on the end of the valve stem.

Pivoted to a bracket 32 at the edge of the lower casing member 11, is an arm 33 which extends through an opening 34 in the lower casing member, and is provided at its inner end with a button 35 which bears against a thin metal disk 36 on the under side of the rubber diaphragm 17. A coiled spring 37 bears against the arm 33 under button 35. The pressure of this spring on the diaphragm is regulated by an adjusting member 38, the upper end of which is threaded and engages the interior threading of a tubular member 39 formed on the under side of casing member 11. An anti-friction thrust bearing is interposed between spring 37 and its adjusting member 38. The adjusting member 38 is formed at its upper end with a stud 38ª on which is arranged an annular member 40 formed with a race 41 for the anti-friction balls 42. The spring 37 bears against an annular member 43 which rests on the balls 42 and is kept in place by a washer 44 secured to the reduced end 45 of stud 39 by off-setting the extremity of the stud.

The pressure regulating device constructed as above described has been found to be capable of a minuteness of regulation and an accuracy and reliability in the maintenance of the pressure for which it is set, possessed, it is believed, by no pressure regulating device heretofore devised. The function of the anti-friction thrust bearing, between the spring 37 and its adjusting member 38, is to eliminate the torsion of the spring against the adjusting member which, unless eliminated or counteracted, would make very minute adjustment impossible. The interposition of the pivoted arm, with its bearing button 35, between the spring 37 and the diaphragm reduces friction to a minimum and thereby increases the sensitiveness of the device. I found that the "Fuller ball" type of valve, when used in this connection, gave much better satisfaction than any other of the numerous types of valve with which experiment was made.

I claim:

1. In a pressure regulating device, the combination with a casing formed with inlet and outlet ports, of a flexible diaphragm extending across said casing, a valve arranged to control communication between said inlet and outlet ports having a stem bearing against one side of said diaphragm, an arm pivoted on said casing formed with a button bearing against the other side of said diaphragm, and a spring which bears against said arm.

2. In a pressure regulating device, the combination with a casing formed with inlet and outlet ports, of a flexible diaphragm extending across said casing, a valve arranged to control communication between said inlet and outlet ports having a stem bearing against one side of said diaphragm, an arm pivoted on said casing formed with a button bearing against said diaphragm, a spring bearing against said arm, an abutment for the spring which is adjustable so as to vary the pressure of the spring against the arm, and a spring interposed between said casing and the opposite side of said diaphragm.

3. In a pressure regulating device, the combination with a casing formed with inlet and outlet ports, of a flexible diaphragm extending across said casing, a valve arranged to control communication between said inlet and outlet ports having a stem bearing against one side of said diaphragm, an arm pivoted on said casing formed with a button bearing against the other side of said diaphragm, a helical spring which bears at one end on said arm, an adjusting member against which the other end of the spring abuts which has a threaded engagement with said casing so as to be movable longitudinally in alinement with the axis of said spring, and a spring interposed between said casing and the opposite side of said diaphragm.

4. In a pressure regulating device, the combination with a casing formed with inlet and outlet ports, of a flexible diaphragm extending across said casing, a valve arranged to control communication between said inlet and outlet ports having a stem provided with a guiding piston and with an enlargement which bears against one side of said diaphragm, a spring interposed between said casing and said enlargement, an arm pivoted on said casing formed with a button bearing against the other side of said diaphragm, a helical spring which bears at one end on said arm, and an adjusting member against which the other end of the spring abuts which has a threaded engagement with said casing so as to be movable longitudinally in alinement with the axis of said spring.

5. In a pressure regulating device, the combination with a casing formed with inlet and outlet ports, of a flexible diaphragm extending across said casing, a valve arranged to control communication between said inlet and outlet ports having a stem bearing against one side of said diaphragm, an arm pivoted on said casing formed with a button bearing against the other side of said diaphragm, a spring which bears against said arm, an adjusting member for said spring having a threaded engagement with the casing, and an anti-friction thrust bearing interposed between said member and spring.

6. In a pressure regulating device, the combination with a casing formed with inlet and outlet ports, of a flexible diaphragm extending across said casing, a valve arranged to control communication between said inlet and outlet ports having a stem bearing against one side of said diaphragm, an arm pivoted on said casing formed with a button bearing against the other side of said diaphragm, a helical spring which bears at one end on said arm, an adjusting member against which the other end of the spring abuts which has a threaded engagement with said casing so as to be movable longitudinally in alinement with the axis of said spring, and an anti-friction thrust bearing interposed between said member and spring.

7. In a pressure regulating device, the combination with a casing formed with inlet and outlet ports, of a flexible diaphragm extending across said casing, a valve arranged to control communication between said inlet and outlet ports having a stem bearing against one side of said diaphragm, an arm pivoted on said casing formed with a button bearing against the other side of said diaphragm, a helical spring which bears at one end on said arm, an adjusting member against which the other end of the spring abuts which has a threaded engagement with said casing so as to be movable longitudinally in alinement with the axis of said spring, an anti-friction thrust bearing interposed between said member and spring, and a spring interposed between said casing and the opposite side of said diaphragm.

8. In a pressure regulating device, the combination with a casing formed with inlet and outlet ports and a communicating port, and with a rounded seat at one end of said communicating port, of a rubber "Fuller ball" valve adapted to coöperate with said seat to control communication between said inlet and outlet ports and provided with a stem, a diaphragm against which said stem bears, a spring which bears against the opposite side of said diaphragm, and means for adjusting the pressure which said spring exerts against said diaphragm.

9. In a pressure regulating device, the combination with a casing formed with inlet and outlet ports and a communicating port, and with a rounded seat at one end of said communicating port, of a rubber "Fuller ball" valve adapted to coöperate with said seat to control communication between said inlet and outlet ports and provided with a stem, a diaphragm against which said stem bears, springs bearing against opposite sides of said diaphragm, and means for adjusting the pressure which one of said springs exerts against said diaphragm.

10. In a pressure regulating device, the combination with a casing formed with inlet and outlet ports and a communicating port, and with a rounded seat at one end of said communicating port, a rubber "Fuller ball" valve adapted to coöperate with said seat and provided with a stem having a guiding piston slidably arranged in said casing, a diaphragm against which said valve stem bears, springs arranged to exert pressure against opposite sides of said diaphragm, and an adjusting member for one of said springs having a threaded engagement with said casing.

11. In a pressure regulating device, the combination with a casing formed with inlet and outlet ports and a communicating port, and with a rounded seat at one end of said communicating port, a rubber "Fuller ball" valve adapted to coöperate with said seat and provided with a stem having a guiding piston slidably arranged in said casing, a diaphragm against which said valve stem bears, springs arranged to exert pressure against opposite sides of said diaphragm, an adjusting member for one of said springs having a threaded engagement with said casing, and a revoluble element on said adjusting member against which said last named spring bears.

12. In a pressure regulating device, the combination with a casing comprising a pair of casing members, one of which is formed with inlet and outlet ports, a communicating port and a valve seat at one end of said communicating port, the other of which is provided with a tubular extension interiorly threaded, a diaphragm clamped between said casing members, a rubber "Fuller ball" valve arranged to coöperate with said valve seat and provided with a stem having an enlargement bearing against said diaphragm and a piston slidably mounted in said casing, a spring interposed between the casing and said enlargement, an arm pivoted on said casing formed with a button bearing against the diaphragm on the opposite side from said valve, a helical spring which bears against said arm, a threaded adjusting member for said spring in said tubular extension on the casing, and an anti-friction bearing interposed between said last named spring and its adjusting member.

13. In a pressure regulating device, the combination with a casing comprising a pair of casing members one of which is formed with inlet and outlet ports, the other of which is provided with a tubular extension interiorly threaded, a plug arranged in said first named casing member formed with a bore, constituting a communicating port between said inlet and outlet ports, and with a rounded seat, a "Fuller ball" valve adapted to coöperate with said seat and having a stem formed with a piston slidably arranged in the bore of said plug and with an enlargement, a rubber diaphragm clamped between said casing members against which the enlargement on the valve stem bears, a spring interposed between said plug and said enlargement, a metal disk on the under side of said rubber diaphragm, an arm pivoted on said casing formed with a button bearing against said disk, a spring bearing against said arm, a threaded adjusting member for the spring in the tubular projection of the casing, and a revoluble element on said adjusting member against which said last named spring bears.

14. In a pressure regulating device, the combination with a casing formed with inlet and outlet ports and a communicating port and with a rounded seat at one end of said communicating port, a rubber Fuller ball valve adapted to coöperate with said seat and provided with a stem having a piston slidably arranged in said casing, a rubber diaphragm extending across said casing, a boss on the end of said valve stem which bears against said rubber diaphragm, a spring interposed between a part of the casing and said boss, a metal plate on the opposite side of said diaphragm, a member pivoted to the casing at one end and provided at one end with a button bearing against said plate, a spring which bears the lever opposite said button, and an adjustable abutment for the other end of said spring.

15. In a pressure regulating device, the combination with a casing formed with inlet and outlet ports and a communicating port, and with a beveled seat at one end of said communicating port, of a resilient "Fuller ball" valve adapted to coöperate with said seat to control communication between said inlet and outlet ports and provided with a stem; a diaphragm against which said stem bears, a spring which bears against the opposite side of said diaphragm, and means for controlling the pressure which said spring exerts against the diaphragm.

AUGUST KADOW.

Witnesses:
S. T. KLOTZ,
WILBER OWEN.